United States Patent
Jan

(10) Patent No.: US 8,249,668 B2
(45) Date of Patent: Aug. 21, 2012

(54) COMMUNICATION DEVICE AND POWER SAVING METHOD THEREOF

(75) Inventor: Hsiao-Shun Jan, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 484 days.

(21) Appl. No.: 12/510,451

(22) Filed: Jul. 28, 2009

(65) Prior Publication Data

US 2010/0099466 A1    Apr. 22, 2010

(30) Foreign Application Priority Data

Oct. 20, 2008    (CN) .......................... 2008 1 0305021

(51) Int. Cl.
  *H04B 1/38* (2006.01)

(52) U.S. Cl. ......... 455/574; 455/572; 455/418; 713/320

(58) Field of Classification Search ............... 455/574, 455/572, 418; 713/320
See application file for complete search history.

(56) References Cited

U.S. PATENT DOCUMENTS

| 6,115,033 A * | 9/2000 | Choi ............................. 345/211 |
| 2004/0225904 A1* | 11/2004 | Perez et al. .................. 713/320 |

* cited by examiner

*Primary Examiner* — Danh Le
(74) *Attorney, Agent, or Firm* — Altis Law Group, Inc.

(57) ABSTRACT

A communication device and a power saving method include setting a power saving mode to control power to a keyboard and a display of the communication device. The communication device and the power saving method further include detecting if a microphone of the communication device receives sound signals in response to invocation of the phone communication feature under the power saving mode, and switching off the power to the keyboard and the display in response to the microphone receiving sound signals.

9 Claims, 3 Drawing Sheets

COMMUNICATION DEVICE AND POWER SAVING METHOD THEREOF

BACKGROUND

1. Technical Field

Embodiments of the present disclosure relate to power management, and more particularly to a communication device and a method for saving power of the communication device.

2. Description of Related Art

Communication devices (e.g., mobile phones) provide more and more functionalities, such as playing songs, capturing photographs, for example. However, each function may consume power of the communication devices. That is, how to save power of the communication devices is important.

What is needed, therefore, is an improved communication device and a power saving method.

DETAILED DESCRIPTION

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module," as used herein, refers to logic embodied in hardware or firmware, or to a collection of software instructions, written in a programming language, such as, for example, Java, C, or assembly. One or more software instructions in the modules may be embedded in firmware, such as an EPROM. It will be appreciated that modules may comprised connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
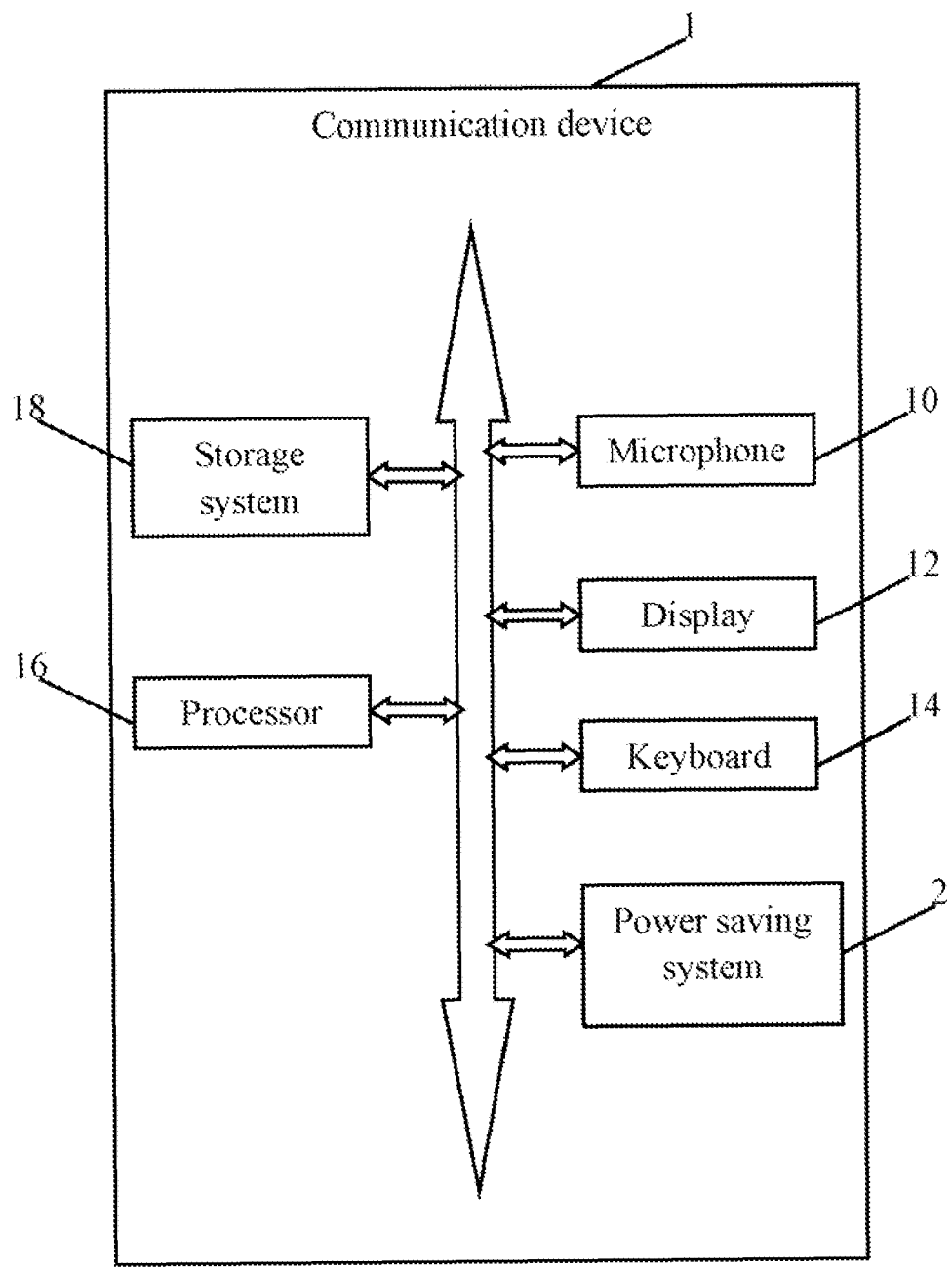
FIG. 1 is a block diagram of one embodiment of a communication device including a power saving system.

FIG. 1 is a block diagram of one embodiment of a communication device 1 including a power saving system 2. The power saving system 2 is used to save power of the communication device 1 by switching off power to a keyboard 14 and a display 12 of the communicating device 1 when a phone communication feature of the communication device 1 has been invoked. It may be understood that the phone communication feature may comprise a user making and/or receiving a phone call, for example. The communication device 1 may be a mobile phone, a personal digital assistant (PDA), or any other kind of computing device. The display 12 may display various kinds of data, such as user interfaces, images, videos, for example. The keyboard 14 may receive data input.

The communication device 1 also includes a microphone 10. The microphone 10 may receive/detect sound signals from an external sound source. In one exemplary embodiment, the sound signals may include the voice of a user of the communication device 1 when the user is making or receiving a phone call. The sound signals, in one embodiment, may be detected by pitch, frequency, or tone of the sound signals, in one example.

The communication device 1 further includes a processor 16 and a storage system 18. The storage system 18 stores one or more programs, such as programs of an operating system, other applications of the communication device 1, and various kinds of data, such as messages, communication records, for example. In one embodiment, the communication device 1 may be a mobile phone, and the storage system 18 may be a memory of the communication device 1 or an external storage card, such as a memory stick, a subscriber identification module (SIM) card, a smart media card, a compact flash card, or any other type of memory card. The processor 16 executes one or more computerized operations of the communication device 1 and other applications, to provide functions of the communication device 1.

Figure 2:
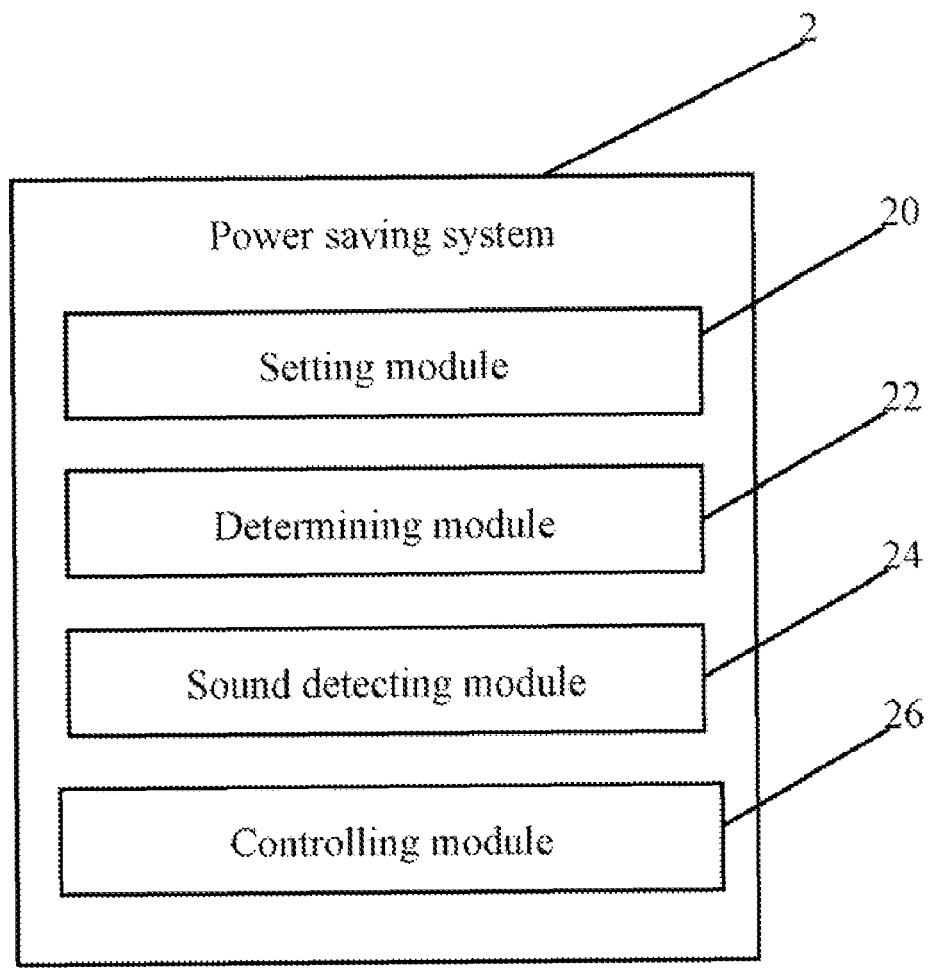
FIG. 2 is a block diagram of one embodiment of the power saving system.

FIG. 2 is a block diagram of one embodiment of the power saving system 2. In one embodiment, the power saving system 2 includes a setting module 20, a determining module 22, a sound detecting module 24, and a controlling module 26. The modules 20, 22, 24, and 26 may comprise one or more computerized programs to be executed by the processor 16 to perform one or more operations of the communication device 1.

The setting module 20 sets a power saving mode to control power to the keyboard 14 and the display 12 of the communication device 1. In one embodiment, under the power saving mode, the power to the keyboard 14 and the display 12 may be switched off when the microphone 10 receives sound signals of the user when the user is making or receiving a phone call. The setting module 20 also presets a hotkey to enter or exit the power saving mode. The hotkey may be any key-press on the keyboard 14, such as a "#" key, for example. In one embodiment, the communication device 1 enters in the power saving mode once the communication device 1 is powered on.

The determining module 22 determines if the phone communication feature of the communication device 1 has been invoked when the communication device 1 is under the power saving mode.

If the phone communication feature of the communication device 1 has been invoked, the sound detecting module 24 detects if the microphone 10 of the communication device 1 receives any sound signals.

If the microphone 10 receives sound signals, (e.g., the user is making or receiving a phone call), the controlling module 26 switches off the power to the keyboard 14 and the display 12 of the communication device 1. If the microphone 10 does not receive any sound signals, power to the keyboard 14 and the display 12 are maintained.

In one embodiment, if the power to the keyboard 14 and the display 12 needs to be resumed while the phone communication feature is being used, the preset hotkey may be manipulated to exit the power saving mode. In such a case, the controlling module 26 detects that the preset hotkey has been manipulated, and switches on the power to the keyboard 14 and the display 12.

The determining module 22 further determines if the phone communication feature has been terminated. If the phone communication feature has been terminated, the controlling module 26 may switch on the power to the keyboard 14 and the display 12.

In another embodiment, under the power saving mode, the power to the keyboard 14 and the display 12 may be switched off once the phone communication feature of the communication device 1 has been invoked regardless whether the microphone 10 receives any sound signals.

Figure 3:
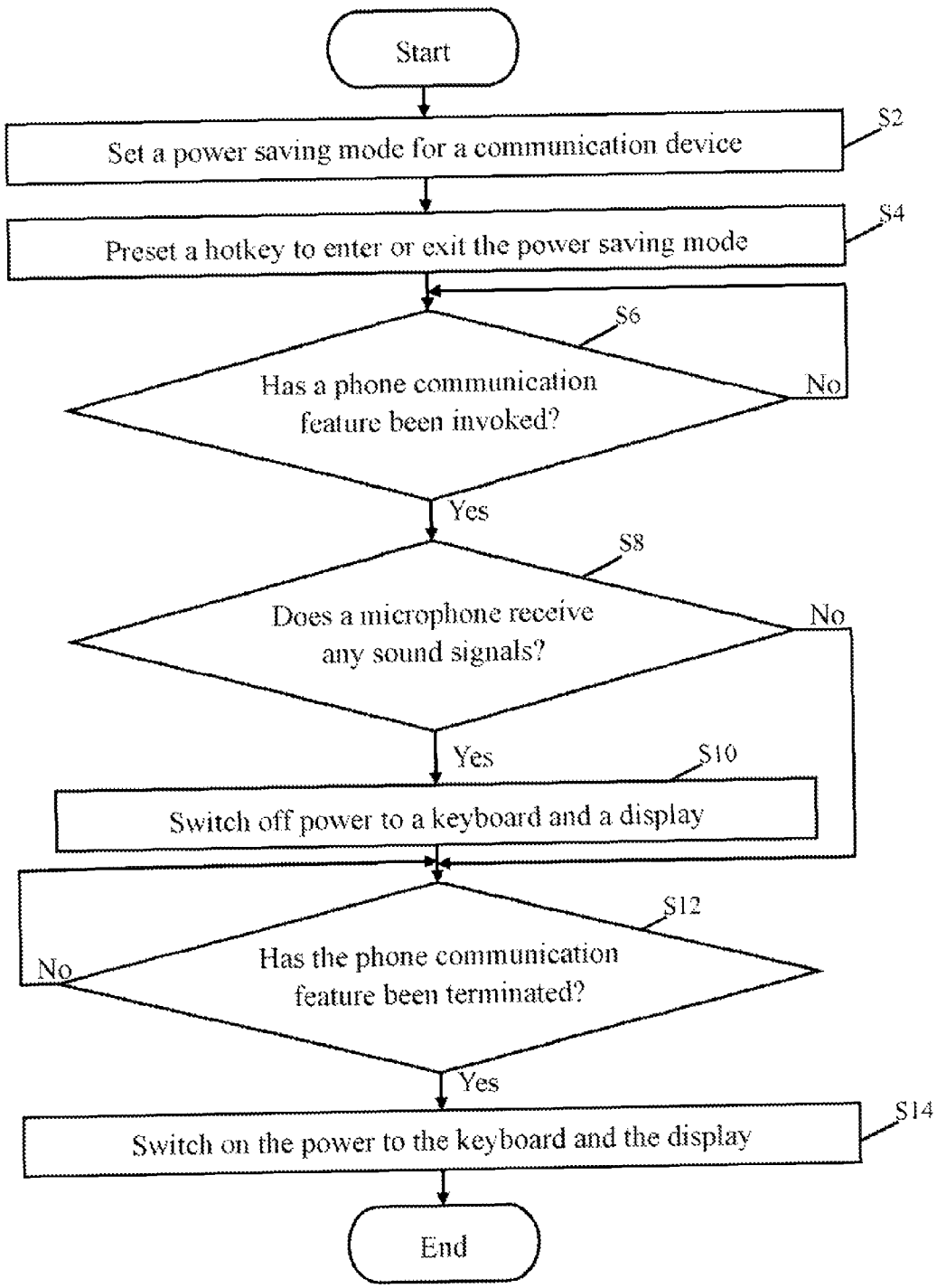
FIG. 3 is a flowchart of one embodiment of a method for saving power of the communication device of FIG. 1.

FIG. 3 is a flowchart of one embodiment of a method for saving power of the communication device 1. Depending on the embodiment, additional blocks may be added, others removed, and the ordering of the blocks may be replaced.

In block S2, the setting module 20 sets a power saving mode to control power to the keyboard 14 and the display 12 of the communication device 1. In one embodiment, under the power saving mode, the power to the keyboard 14 and the display 12 may be switched off when the microphone 10 receives sound signals of the user when the user is making or receiving a phone call.

In block S4, the setting module 20 presets a hotkey to enter or exit the power saving mode.

In block S6, the determining module 22 determines if the phone communication feature of the communication device 1 has been invoked when the communication device 1 is under the power saving mode. If the phone communication feature has not been invoked, the procedure returns to block S6 directly.

If the phone communication feature of the communication device 1 has been invoked, in block S8, the sound detecting module 24 detects if the microphone 10 of the communication device 1 receives any sound signals.

If the microphone 10 receives sound signals, in block S10, the controlling module 26 switches off the power to the keyboard 14 and the display 12 of the communication device 1. If the microphone 10 does not receive any sound signals, the procedure goes to block S12 directly.

In block S12, the determining module 22 determines if the phone communication feature has been terminated. If the phone communication feature has been terminated, in block S14, the controlling module 26 switches on the power to the keyboard 14 and the display 12 of the communication device 1. If the phone communication feature has not been terminated yet, the procedure returns to block S12.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A power saving method for a communication device, the method comprising:
setting a power saving mode to control power to a keyboard and a display of the communication device;
presetting a hotkey of the communication device to enter or exit the power saving mode;
determining if a phone communication feature of the communication device has been invoked when the communication device is under the power saving mode;
detecting if a microphone of the communication device receives sound signals, in response to invocation of the phone communication feature;
in response to the microphone receiving sound signals, switching off the power to the keyboard and the display of the communication device; and
switching on the power to the keyboard and the display of the communication device in response to manipulation of the hotkey to exit the power saving mode.

2. The method according to claim 1, further comprising:
determining if the phone communication feature has been terminated; and
switching on the power to the keyboard and the display of the communication device, if the phone communication feature has been terminated.

3. The method according to claim 1, further comprising:
resuming the power to the keyboard and the display of the communication device if the microphone does not receive sound signals.

4. A communication device, the communication device comprising:
a storage system;
at least one processor; and
one or more programs stored in the storage system and being executable by the at least one processor, the one or more programs comprising:
a setting module operable to set a power saving mode to control power to a keyboard and a display of the communication device, and preset a hotkey of the communication device to enter or exit the power saving mode;
a determining module operable to determine if a phone communication feature of the communication device has been invoked when the communication device is under the power saving mode;
a sound detecting module operable to detect if a microphone of the communication device receives sound signals, in response to invocation of the phone communication feature; and
a controlling module operable to switch off the power to the keyboard and the display of the communication device in response to the microphone receiving sound signals, and switch on the power to the keyboard and the display of the communication device in response to manipulation of the hotkey to exit the power saving mode.

5. The communication device according to claim 4, wherein the determining module is further operable to determine if the phone communication feature has been terminated, and the controlling module is further operable to switch on the power to the keyboard and the display of the communication device if the phone communication feature has been terminated.

6. The communication device according to claim 4, wherein the controlling module is further operable to resume the power to the keyboard and the display of the communication device if the microphone does not receive sound signals.

7. A storage medium storing a set of instructions, the set of instructions capable of being executed by a processor to perform a power saving method for a communication device, the method comprising:
setting a power saving mode to control power to a keyboard and a display of the communication device;
presetting a hotkey of the communication device to enter or exit the power saving mode;
determining if a phone communication feature of the communication device has been invoked when the communication device is under the power saving mode;
detecting if a microphone of the communication device receives sound signals, in response to invocation of the phone communication feature;
in response to the microphone receiving sound signals, switching off the power to the keyboard and the display of the communication device; and
switching on the power to the keyboard and the display of the communication device in response to manipulation of the hotkey to exit the power saving mode.

8. The storage medium as claimed in claim 7, wherein the method further comprises:
determining if the phone communication feature has been terminated; and switching on the power to the keyboard and the display of the communication device, if the phone communication feature has been terminated.

9. The storage medium as claimed in claim 7, wherein the method further comprises:

resuming the power to the keyboard and the display of the communication device if the microphone does not receive sound signals.

* * * * *